(12) United States Patent  
Matsushita

(10) Patent No.: US 7,024,957 B2  
(45) Date of Patent: Apr. 11, 2006

(54) LEAD SCREW FOR LINEAR ACTUATOR, AND METHOD OF MANUFACTURING THE SAME

(75) Inventor: Kunitake Matsushita, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/053,004

(22) Filed: Feb. 8, 2005

(65) Prior Publication Data

US 2005/0139028 A1  Jun. 30, 2005

Related U.S. Application Data

(62) Division of application No. 10/190,994, filed on Jul. 8, 2002.

(30) Foreign Application Priority Data

Jul. 11, 2001 (JP) .............................. 2001-210498

(51) Int. Cl.
  F16H 27/02   (2006.01)
  F16H 1/24    (2006.01)
  B21B 1/46    (2006.01)
  B29B 7/00    (2006.01)

(52) U.S. Cl. ............... 74/424.75; 74/89.23; 74/424.71; 264/328.1; 264/328.12; 29/527.2; 29/527.4; 29/530

(58) Field of Classification Search ............. 74/424.75, 74/89.23, 424.71; 264/328.1, 328.12; 29/527.2, 29/527.4, 530

See application file for complete search history.

(56) References Cited

U.S. PATENT DOCUMENTS 3,161,447 A * 12/1964 Larsson ..................... 384/425  
5,133,125 A *  7/1992 Diebels et al. ............ 29/527.2  
5,533,247 A *  7/1996 Ishii et al. ................. 29/527.4

* cited by examiner

Primary Examiner—Richard W. Ridley  
Assistant Examiner—Colby Hansen  
(74) Attorney, Agent, or Firm—Muirhead and Saturnelli, LLC

(57) ABSTRACT

A lead screw for a linear actuator, which has a metal pipe having a helical projection resin-molded on its outer surface, and a ball for a pivot bearing welded to a distal end of the metal pipe, is disclosed together with a method of manufacturing the same. With the lead screw according to this invention, a slight positional deviation from the origin, which is caused at a high ambient temperature by thermal expansion of a resin material filled up in the metal pipe, can be prevented reliably. Linear movement upon rotation of a stepping motor can take place with high precision.

1 Claim, 5 Drawing Sheets

LEAD SCREW FOR LINEAR ACTUATOR, AND METHOD OF MANUFACTURING THE SAME

CROSS REFERENCE TO RELATED APPLICATIONS

This application is a divisional of U.S. application Ser. No. 10/190,994 filed Jul. 8, 2002 (pending).

BACKGROUND OF THE INVENTION

1. Field of the Invention

The present invention relates to a lead screw used in a linear actuator, and a method of manufacturing the same.

2. Description of the Prior Art

A linear actuator having a lead screw is set in, e.g., a floppy (registered tradename) disk drive unit (FDD), and is used to linearly drive a carriage with a magnetic head so as to access a desired track.

FIG. 1 is a perspective view showing the schematic arrangement of a floppy (registered tradename) disk drive unit 50 with a linear actuator 40 to which a conventional lead screw 30 is attached.

As shown in FIG. 1, in the floppy (registered tradename) disk drive unit 50, a pressure bar spring 42 extending from a carriage 51 supports the lead screw 30 and holds a needle 43 pressing against a groove formed in the lead screw 30. Thus, when the lead screw 30 is rotated by a stepping motor 41, the carriage 51 with a magnetic head 52 slides on a guide bar 53 to move linearly. The magnetic head 52 mounted on the carriage 51 can access a track on a desired magnetic disk (not shown) upon forward/reverse rotation of the stepping motor 41.

FIG. 2 is a side view of the linear actuator 40 in which the lead screw 30 is attached to the stepping motor 41.

As shown in FIG. 2, the stepping motor 41 is attached to a side plate 55 of the floppy (registered tradename) disk drive unit 50 (see FIG. 1). One end of the lead screw 30 is supported by a pivot bearing (not shown) in the stepping motor 41, and the other end thereof is supported by a pivot bearing 45 attached to a base 44 to which the stepping motor 41 is fixed.

Conventionally, the lead screw 30 for use in the floppy (registered tradename) disk drive unit 50 has been formed by machining a predetermined helical thread as required in a metal rod made of brass or stainless steel.

Although the conventional lead screw 30 made as described above has a high dimensional precision, its machining method is complicated, and its manufacturing cost is high. Furthermore, it does not have a good productivity. As a result, it can not be provided at a low cost.

In order to solve the above problems, a lead screw having a resin-molded thread has been put into practical use, as is proposed by the present applicant (assignee) and disclosed in Japanese Unexamined Patent Publication No. 8-118371.

FIG. 3 is a sectional view showing the main part of a manufacturing apparatus for a conventional lead screw 60 having a resin-molded thread 63.

A metal pipe 61, which has in its wall portion 61*a* penetrated holes 62 arrayed helically at predetermined intervals so as to correspond to the thread 63 to be resin-molded, and a metal mold 69, which has on its inner surface a helical groove 68 (for shaping the thread 63) corresponding to the array of the penetrated holes 62, are placed in the manufacturing apparatus. The metal pipe 61 is set in a cavity 67 of the mold 69 such that the array of the penetrated holes 62 and the helical groove 68 correspond to each other. When the lead screw 60 is manufactured, a resin material is injected into the metal pipe 61 so that the resin material flows into the cavity 67 through the penetrated holes 62, so that the thread 63 is resin-molded. With this technique, a high-precision, inexpensive lead screw can be manufactured.

FIG. 4 is a side view showing the conventional lead screw 60 having the resin-molded thread 63.

As shown in FIG. 4, the lead screw 60 is supported, through a ball 66, by a pivot bearing 45 fixed to a base 44.

The interior of the metal pipe 61 is simultaneously filled with a resin 64 when the thread 63 is resin-molded. The ball 66 is in contact with the resin 64.

The lead screw 60 has no problem in its pitch characteristics, but the position of its origin slightly changes depending on the ambient temperature (normal or high (e.g., 80° C.)) due to the temperature characteristics, that is, the coefficient of thermal expansion of the resin 64. For this reason, the distance of linear movement of the lead screw 60 upon rotation of the stepping motor may vary slightly.

SUMMARY OF THE INVENTION

The present invention has been made in consideration of the above situation in the prior art, and has for its object to provide a lead screw for a linear actuator and a method of manufacturing the same, that does not suffer a slight deviation in position of the origin, which is caused by thermal expansion of the resin that filled in the metal pipe when the ambient temperature increases, so that linear movement upon rotation of the stepping motor can take place precisely.

In order to achieve the above object, according to a first aspect of the present invention, a lead screw for a linear actuator comprises: a metal pipe which has a helical projection resin-molded on an outer surface thereof; and a ball for a pivot bearing which is welded to distal end of the metal pipe.

According to a second aspect of the present invention, a lead screw for a linear actuator comprises: a metal pipe which has a helical projection resin-molded on an outer surface thereof and which is filled with a resin such that the resin is not fully filled in the metal pipe thereby not touching the ball; and a ball for a pivot bearing which is in direct contact with a distal end of the metal pipe.

According to a third aspect of the present invention, a method of manufacturing a lead screw for a linear actuator comprises the steps of: forming penetrated holes to be arrayed helically at predetermined intervals in a wall portion of a metal pipe; welding a ball to a distal end of the metal pipe; setting the metal pipe at a predetermined position in a cavity of a metal mold; and injecting a resin material into the metal pipe so that the resin material flows into the cavity through the penetrated holes, thereby resin-molding a thread in the cavity as well as filling the metal pipe with the resin material.

According to a fourth aspect of the present invention, a method of manufacturing a lead screw for a linear actuator comprises the steps of: forming penetrated holes to be arrayed helically at predetermined intervals in a wall portion of a metal pipe; inserting a plug of a predetermined size in a distal end of the metal pipe; setting the metal pipe at a predetermined position in a cavity of a metal mold; injecting a resin material into the metal pipe so that the resin material flows into the cavity through the penetrated holes, thereby resin-molding a thread in the cavity as well as filling the metal pipe with the resin material; and removing the plug after the metal pipe is filled with the resin material.

In the first aspect, the ball is fixed to a circumference of the distal end of the metal pipe. Therefore, even when the ambient temperature increases, a slight deviation in position of the origin, which is caused by thermal expansion of the resin material filled in the metal pipe, can be prevented reliably, so that linear movement upon rotation of a stepping motor can take place with high precision.

Further, in the second aspect, a certain gap is provided between the resin material in the metal pipe and the ball, so that direct contact therebetween can be avoided. Therefore, even when the ambient temperature increases, a slight deviation in position of the origin, which is caused by thermal expansion of the resin material filled in the metal pipe, can be prevented reliably, so that linear movement upon rotation of a stepping motor can take place with high precision.

Still further, a method of manufacturing a lead screw for a linear actuator according to the present invention makes it possible to easily manufacture a lead screw which does not suffer a slight deviation in position of the origin caused by thermal expansion of the resin material filled in the metal pipe.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described with reference to the accompanying drawings.

Figure 1:
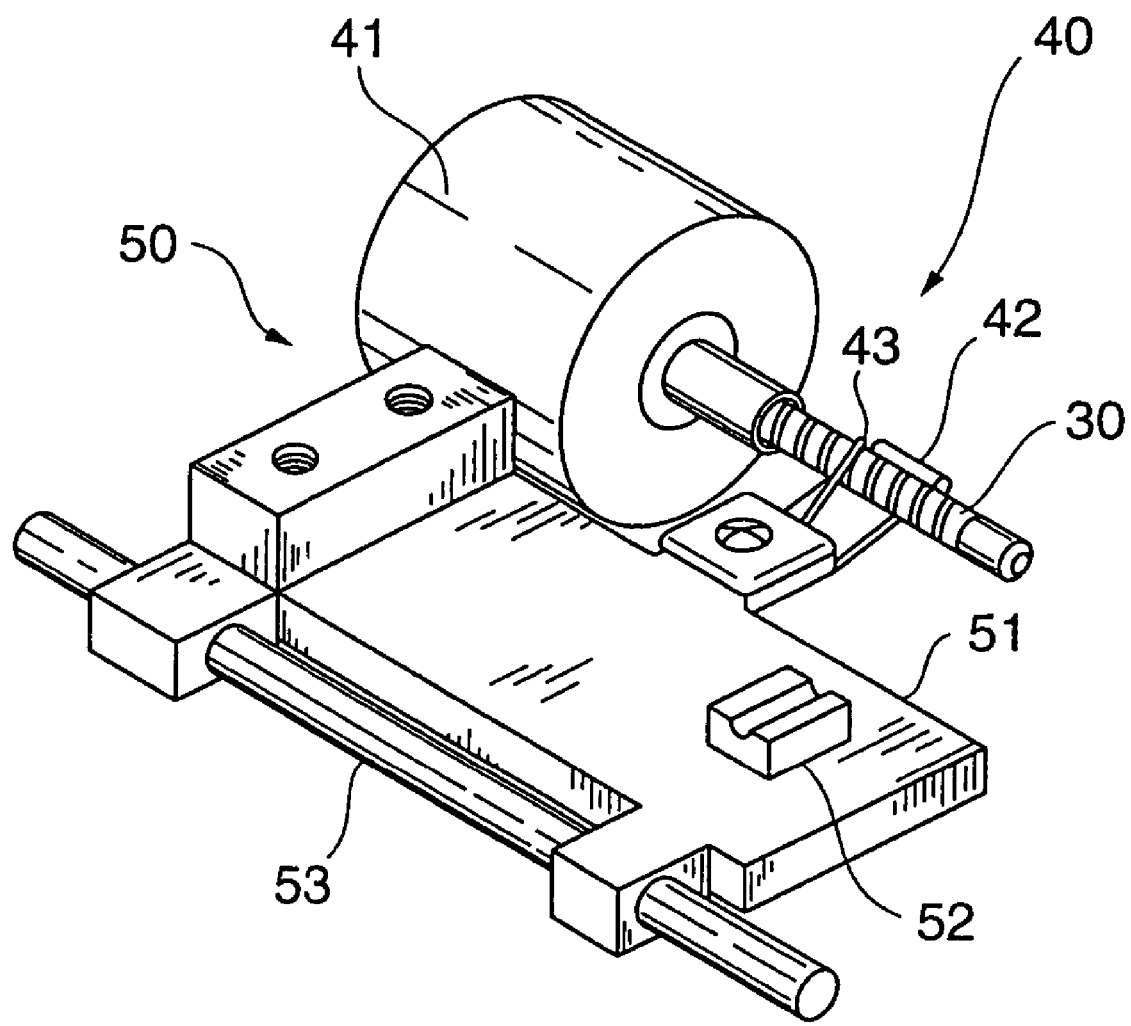
FIG. 1 is a perspective view showing a floppy (registered tradename) disk drive unit with a linear actuator to which a conventional lead screw is attached.
Figure 2:
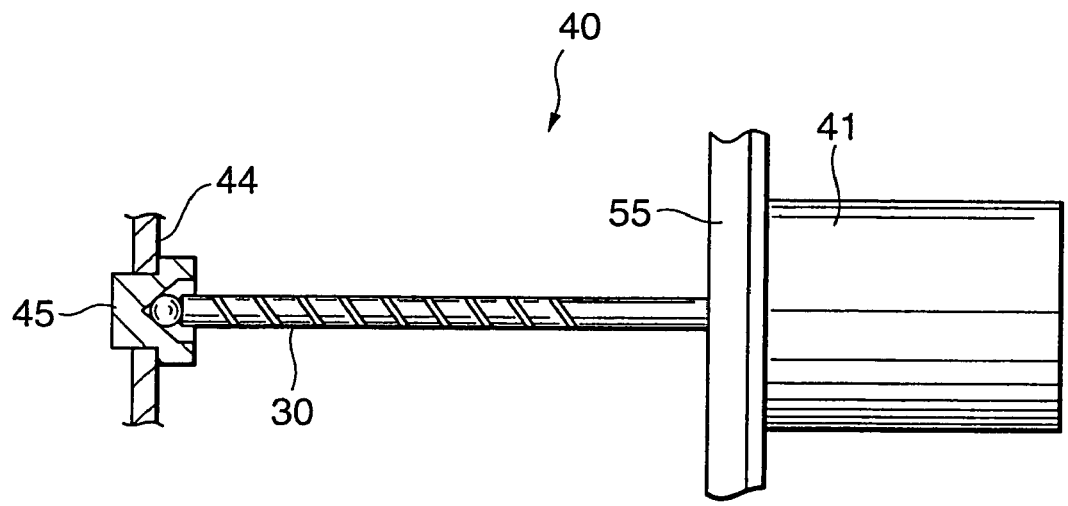
FIG. 2 is a side view showing the linear actuator in which the conventional lead screw is attached to a stepping motor.
Figure 3:
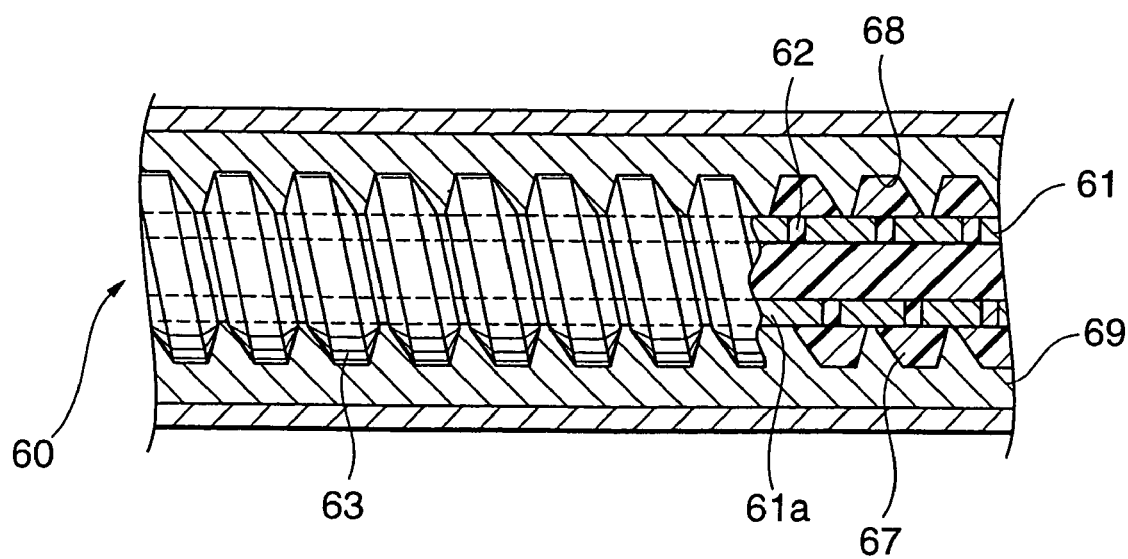
FIG. 3 is a sectional view showing the main part of an apparatus for manufacturing the conventional lead screw having a resin-molded thread.
Figure 4:
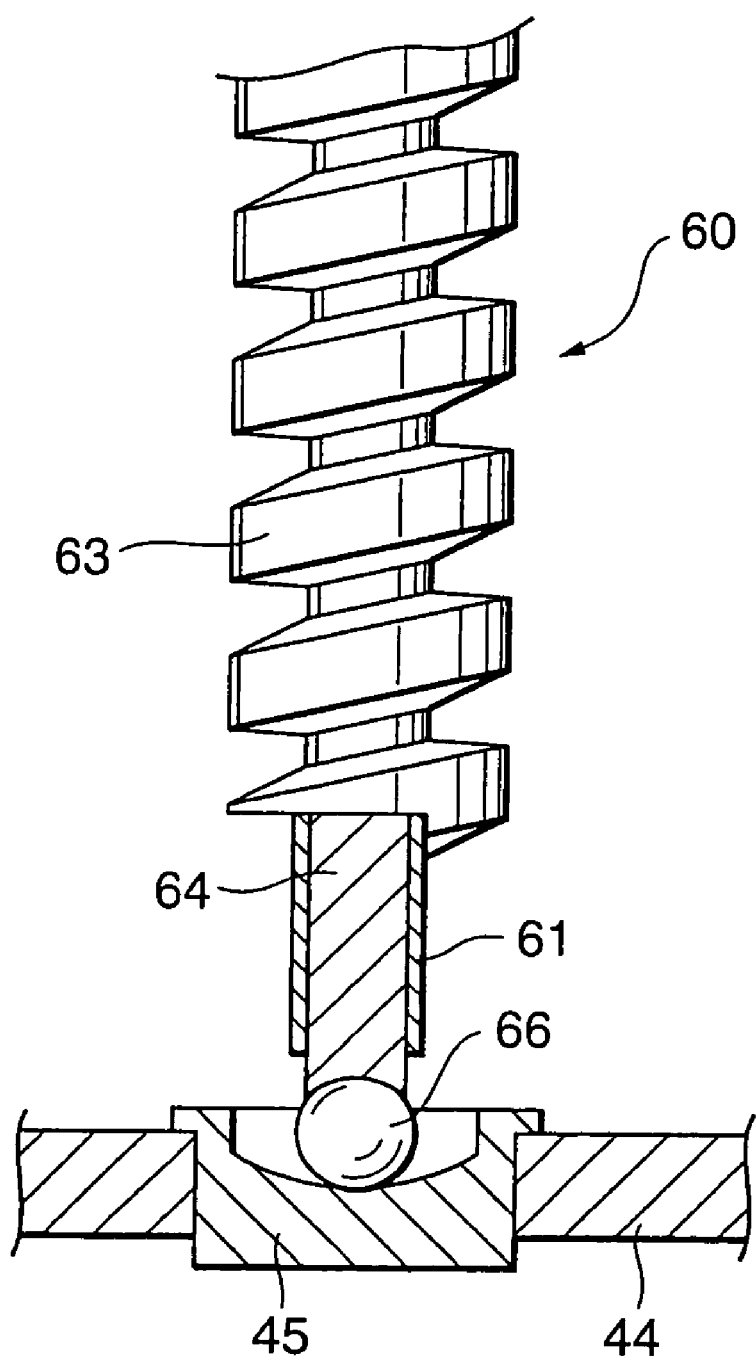
FIG. 4 is a side view showing the conventional lead screw having a resin-molded thread.
Figure 5:
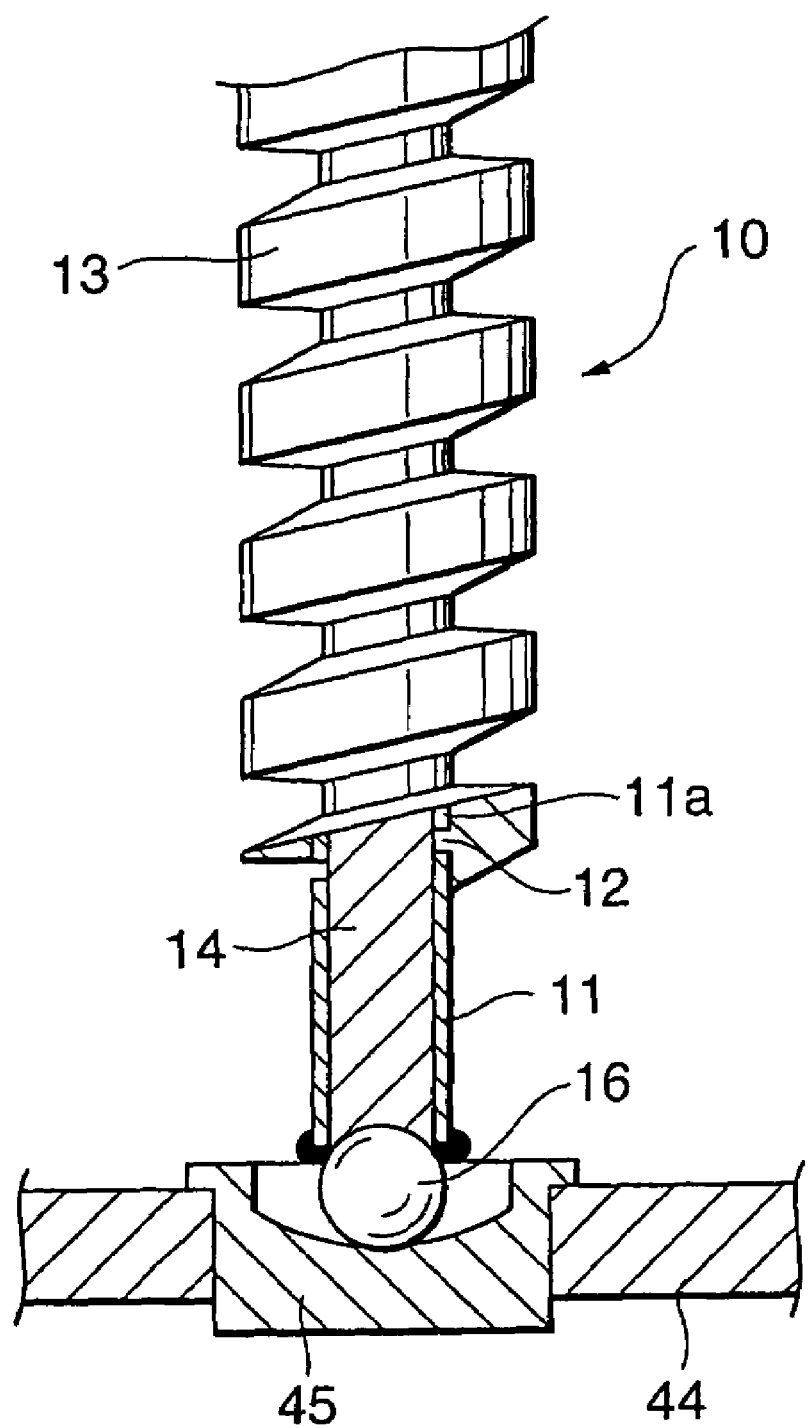
FIG. 5 is a side view showing a lead screw according to the first embodiment of the present invention.

Referring to FIG. 5, a lead screw 10 is comprised of a metal pipe 11 made of, e.g., stainless steel, a thread 13 which is a resin-molded helical projection formed on an outer surface of the metal pipe 11, and a ball 16 welded to a circumference of a distal end of the metal pipe 11, and is supported, through the ball 16, by a pivot bearing 45 fixed to a base 44.

The interior of the metal pipe 11 is filled with a resin material 14, while the thread 13 is molded with the resin material 14 flowing through penetrated holes 12 formed in a wall portion 11a of the metal pipe 11. As a result, the thread 13 and the resin material 14 communicate with each other through the penetrated holes 12, so that the thread 13 is reliably fixed to the metal pipe 11.

The ball 16 is welded to a circumference of the distal end of the metal pipe 11. Therefore, even when the ambient temperature increases, deviation in the position of the origin, which is caused by thermal expansion of the resin material 14 filled in the metal pipe 11, can be reliably prevented.

A method of manufacturing the lead screw 10 according to the first embodiment of the present invention includes the steps of: forming the penetrated holes 12 to be arrayed helically at predetermined intervals to correspond to the thread 13 in the wall portion 11a of the metal pipe 11; welding the ball 16 to the circumference of the distal end of the metal pipe 11; placing and setting the metal pipe 11 in a cavity of a metal mold (not shown) so that the thread 13 and an array of the penetrated holes 12 correspond to each other; and injecting the resin material 14 into the metal pipe 11 so that the resin material 14 flows into the cavity through the penetrated holes 12, thereby resin-molding the thread 13 in the cavity and filling the interior of the metal pipe 11 with the resin material.

As described above, in the lead screw 10 according to the first embodiment of the present invention, the ball 16 is welded to the distal end of the metal pipe 11. Therefore, even when the ambient temperature increases, a slight deviation in position of the origin, which is normally caused by thermal expansion of the resin material 14 filled in the interior of the metal pipe 11, can be reliably prevented.

This manufacturing method makes it possible to easily manufacture the lead screw 10 which does not suffer a slight deviation in position of the origin, even when the ambient temperature increases.

Next, a second embodiment of the present invention will be described with reference to FIG. 6.

Figure 6:
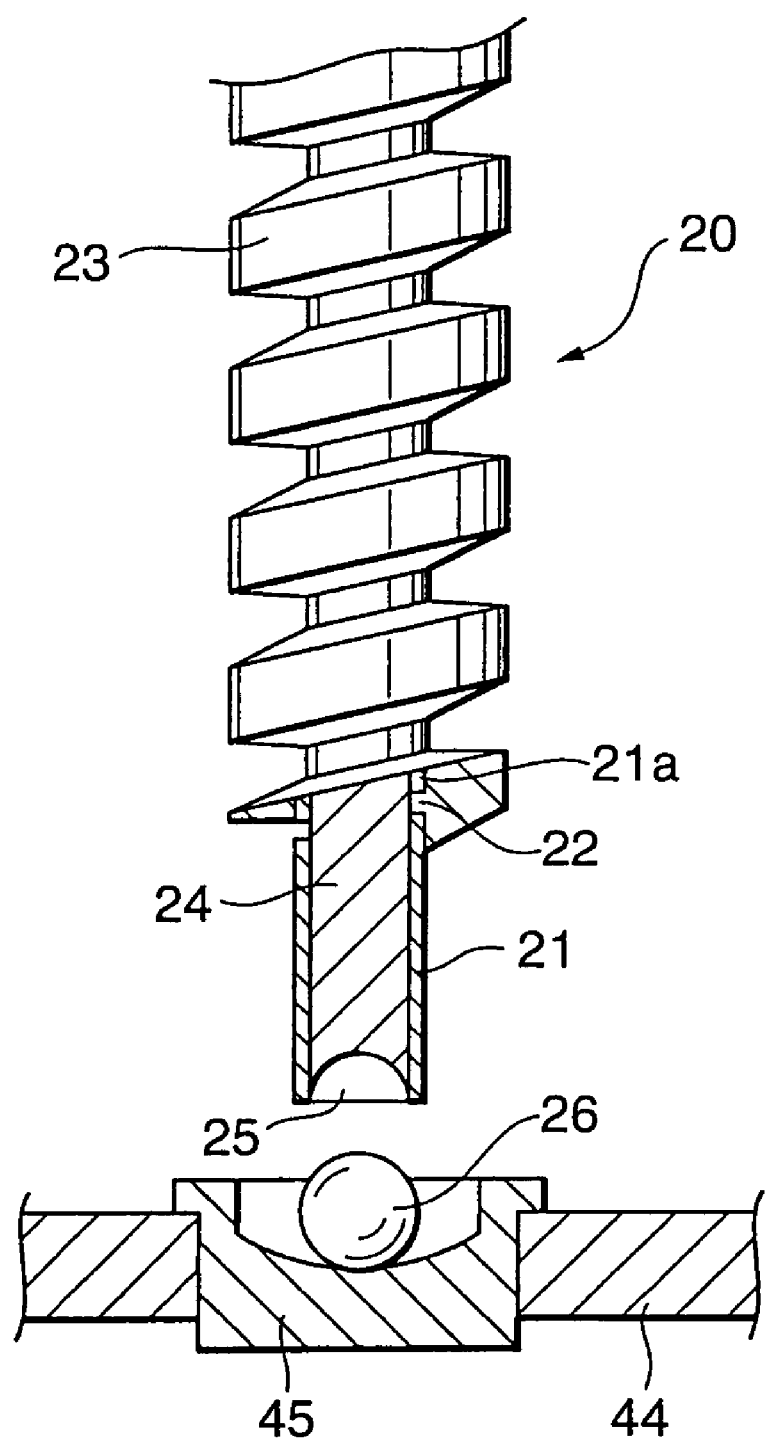
FIG. 6 is a side view showing a lead screw according to the second embodiment of the present invention.

As shown in FIG. 6, the lead screw 20 is comprised of a metal pipe 21 made of, e.g., stainless steel, a thread 23 which is a resin-molded helical projection formed on an outer surface of the metal pipe 21, and a ball 26 which is in contact with a circumference of one end of the metal pipe 21, and is supported, through the ball 26, by a pivot bearing 45 fixed to a base 44.

The interior of the metal pipe 21 is filled with a resin material 24 while the thread 23 is molded with the resin material 24 flowing through the penetrated holes 22. As a result, the thread 23 and the resin material 24 communicate with each other through the penetrated holes 22, so that the thread 23 is reliably fixed to the metal pipe 21.

Since a plug 25 is inserted into a distal end of the metal pipe 21 before resin molding and removed therefrom after resin-molding, the resin material 24, which is injected into the metal pipe 21, is not squeezed out from any point of the circumference of the distal end of the metal pipe 21, and does not touch the ball 26. Hence, the ball 26 comes into contact with the metal pipe 21. Thus, even when the ambient temperature increases, a deviation in the position of the origin, which is caused by thermal expansion of the resin material 24 filled in the metal pipe 21, can be reliably prevented.

A method of manufacturing the lead screw 20 according to the second embodiment of the present invention includes the steps of: forming the penetrated holes 22 to be arrayed helically at predetermined intervals to correspond to the thread 23 in the wall portion 21a of the metal pipe 21; inserting the plug 25 with a predetermined size into the distal end of the metal pipe 21; placing and setting the metal pipe 21 in a cavity of a metal mold (not shown) so that the thread 23 and the array of the penetrated holes 22 correspond to each other; injecting the resin material 24 into the metal pipe 21 so that the resin material 24 flows into the cavity through the penetrated holes 22, thereby resin-molding the thread 23 in the cavity; and removing the plug 25 after the interior of the metal pipe 21 has been filled with the resin material 24. The ball 26 is mounted between the distal end of the metal pipe 21 and the pivot bearing 45.

As described above, in the lead screw 20 according to the second embodiment of the present invention, since a certain gap defined by the plug 25 is provided between the resin material 24 and the ball 26, the metal pipe 21 and the ball 26 are in direct contact with each other. Therefore, even when the ambient temperature increases, a slight deviation in position of the origin, which is caused by thermal expansion of the resin material 24 filled in the metal pipe 21, can be reliably prevented.

The manufacturing method of the second embodiment makes it possible to easily manufacture the lead screw 20 which does not suffer a slight deviation in position of the origin, even when the ambient temperature increases.

What is claimed is:

1. A method of manufacturing a lead screw for a linear actuator, said method comprising the steps of:

(a) forming penetrated holes to be arrayed helically at predetermined intervals in a wall portion of a metal pipe;

(b) inserting a plug of a predetermined size into a distal end of said metal pipe so as to form a space having a capacity to contain a portion of a ball for use in a pivot bearing;

(c) setting said metal pipe at a predetermined position in a cavity of a metal mold;

(d) injecting a resin material into said cavity of the metal mold so that said resin material flows into said metal pipe through said penetrated holes, thereby resin-molding a thread in said cavity as well as filling an interior of said metal pipe with said resin material;

(e) removing said plug after said metal pipe is filled with said resin material; and (f) disposing said ball at the distal end of said metal pipe so that said ball is in direct contact with an inner circumferential edge of the distal end of said pipe, whereby a portion of said ball is disposed within said space without touching a distal end of said resin material.

* * * * *